Feb. 7, 1967  G. MORESSÉE ETAL  3,303,371
AXIAL AIR-GAP ELECTRICAL MACHINE
Filed March 21, 1960  2 Sheets-Sheet 1

INVENTORS
Georges Moressée
Robert Déchet
By Pierce, Scheffler & Parker
Attorneys INVENTORS
Georges Moressée
Robert Déchet
By Pierce, Scheffler & Parke
Attorneys United States Patent Office 3,303,371
Patented Feb. 7, 1967

3,303,371
AXIAL AIR-GAP ELECTRICAL MACHINE
Georges Moressée, Neuilly-sur-Seine, and Robert Déchet, Boulogne-sur-Seine, France, assignors to Compagnie Electro Mecanique, a corporation of France
Filed Mar. 21, 1960, Ser. No. 16,326
Claims priority, application France, Mar. 26, 1959, 790,697
1 Claim. (Cl. 310—268)

This invention relates generally to an axial air gap electrical machine having an improved magnetic circuit, and more particularly to an axial air gap machine having an annular magnetic element in which is formed by magnetization treatment a plurality of angularly-spaced successively oppositely arranged permanent magnet poles.

The use of permanent magnets for the excitation of electrical machines is, of course, well known in the prior art. Such machines, having a plurality of permanent magnets mounted on a ferromagnetic yoke, involve complicated manufacture and assembly of numerous elements as well as considerable machining after assembly to obtain a precise, geometrically-uniform air gap. In order to properly adjust the excitation of such an inductor made in this fashion, a magnetic ring is usually required to shunt a portion of the inductive magnetic flux.

Instead of the multiple permanent magnet construction it is also known to use single excitation magnet to which is connected two polar extensions so formed that each extension presents half the number of poles to establish, along the air gap, alternatively, the desired opposite polarities.

The primary object of the present invention is to provide an axial air gap machine having a novel magnetic circuit including a basic element formed of a ferromagnetic substance having a strong remanence and a very high coercivity.

A more specific object of the invention is to provide an axial air gap machine having a ferromagnetic element formed from a suitable metallic alloy (such as ferrites or agglomerates which may or may not be isotropic), said magnetic element having formed therein by suitable magnetization treatment a number of magnetic poles of successive alternate polarity adjacent and angularly spaced from each other.

According to the present invention, an annular magnetic ring is treated by known magnetization processes to have therein a plurality of angularly-spaced magnetic poles of successively opposite polarity. In this manner, for a ring of definite geometric form and dimensions, a large number of magnetic circuits may be formed, since not only is great liberty permitted as to the number of poles to be chosen, but also, for each armature circuit, the form of the magnetized surface of the annular magnetic element or torus may be designed to obtain an optimum output— i.e., maximum useful effect with a minimum of flux leakage.

The present invention opens the way for the use of electrotechniques, already known in the electronics field, for the manufacture of "modular" parts in series. Finally, the toroidal magnetic element may be modified in form according to the construction requirements; thus in the case of direct-current rotating machines, slots or notches may be provided between the magnetized polar portions for receiving carbon brushes which frictionally engage the armature conductors.

Other objects and advantages of our invention will become more apparent from a study of the following specification when considered in conjunction with the accompanying drawings in which.

Figure 1:
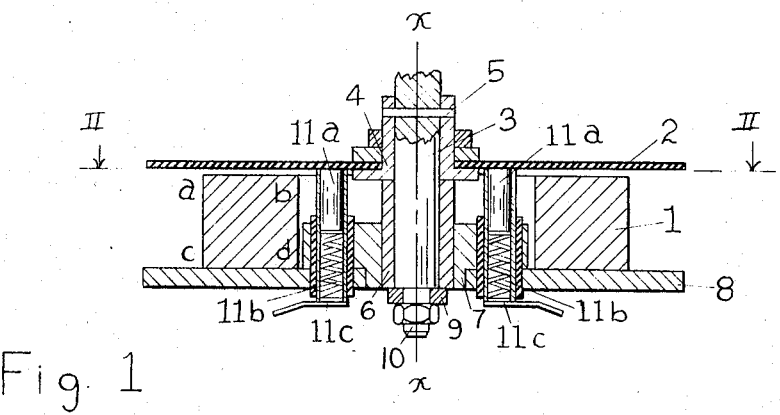
FIG. 1 is a longitudinal sectional view of a direct-current axial air-gap machine.
Figure 2:
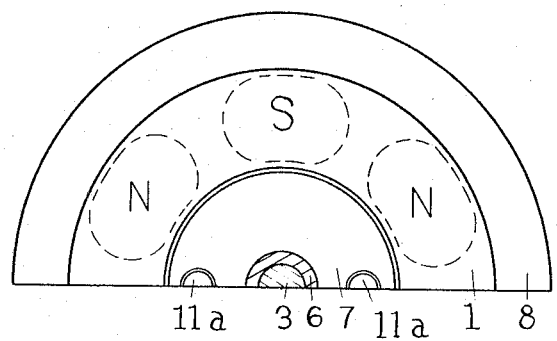
FIG. 2 is a transverse view taken along line II—II of FIG. 1.

Referring now more particularly to FIGS. 1 and 2, the direct-current axial air gap machine includes an annular magnetic element 1 in the form of a torus defined by the generation of a rectangle ($a, b, d, c,$) about the axis $x$—$x$. This magnetic element, which constitutes the inductor, cooperates with the armature 2 which is secured to the spindle 3 by means of the flanged sleeve 4 connected to the spindle by pin 5. The armature 2 is in the form of a thin non-conductive disk or lamellar having flat electrical conductors formed on one or both sides thereof preferably by well-known printed circuitry techniques. The spindle 3 is rotatably mounted in the self-lubricated sleeve 6 secured in ring 7. Ring 7 is secured to the iron plate 8 upon which is attached the annular magnetic element 1 by suitable means (not shown). The iron plate 8 may or may not serve as part of the magnetic yoke, as desired. The length of the axial air gap between the thin rotating armature 2 and the magnetic element 1 is determined by the length of the sleeve 6 and by the relative longitudinal position of the spindle 3 as determined by the thickness of washer 9 and the setting of the nut 10 threadably mounted upon the end of spindle 3. Carbon brushes 11a are biased upwardly by conductive spring 11b against the lower surface of the armature disk 2 to frictionally engage the conductors positioned thereon. Current is conducted from brushes 11a through springs 11b to the terminals 11c.

As shown in FIG. 2, the magnetic element 1 has formed therein by known magnetization treatment a plurality of angularly-spaced holes of successive alternate polarity. The annular element is formed of a suitable ferromagnetic material—such as one or more metallic alloys, notably ferrites or agglomerates, which may or may not be isotropic—having a strong remanence and very high coercivity. In the embodiment of FIGS. 1 and 2, the annular magnetic element has been shown as having formed therein by magnetization treatment six poles each having an ellipsoidal cross-sectional configuration, although other numbers of poles of various configuration could be used in different applications. In the embodiment of FIGS. 1 and 2 the air space above the armature disk 2 serves as part of the path of flux extending from a north pole on the magnet element 1 through the disk 2 to a south pole.

Figure 3:
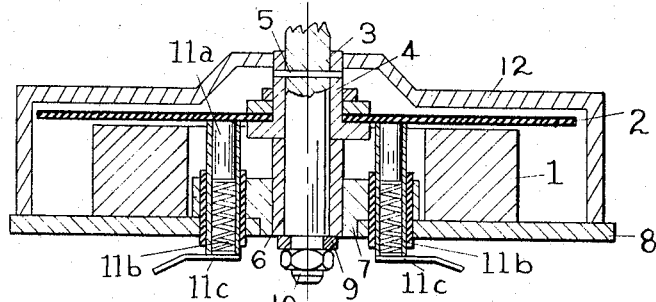
FIG. 3 is a longitudinal sectional view of the machine of FIG. 1 provided with a ferromagnetic yoke housing for return of the magnetic flux.

As shown in FIG. 3, a housing 12 of soft iron or other ferromagnetic material may be attached to the plate 8 to enclose the armature 2 and the magnetic element 1. In this case the magnetic flux paths passing through the armature 2 from a north pole on magnetic member 1 to a south pole thereon includes a portion of the ferromagnetic housing 12.

Figure 4:
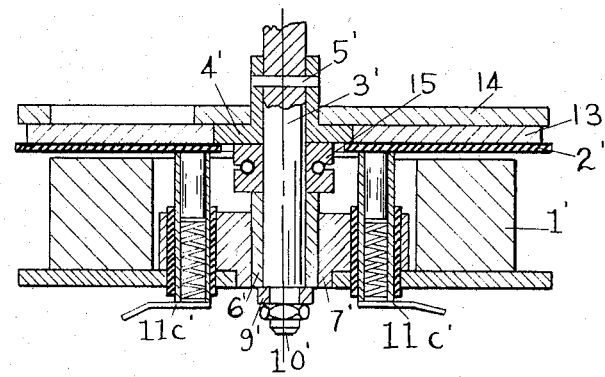
FIG. 4 is a longitudinal sectional view of an axial air-gap machine similar to that of FIG. 1 wherein the armature is backed by a ferromagnetic disk.

In order to improve the closure of the magnetic circuit and to reduce the air-gap, a soft ferromagnetic disk 13 (of ferrite for example) may be secured behind the armature 2′ as shown in FIG. 4. This disk 13 is mounted on plate 14 which is secured to flanged sleeve 4′ and rotates with the armature 2′. Ball bearings 15 are provided to support the assembly of disks 2′ and 13 against the magnetic force of attraction on disk 13 caused by magnetic element 1'. The ferrite disk 13 could possibly be replaced by a compact spiral formed from a sheet metal ribbon capable of carrying the armature winding.

Figure 5:
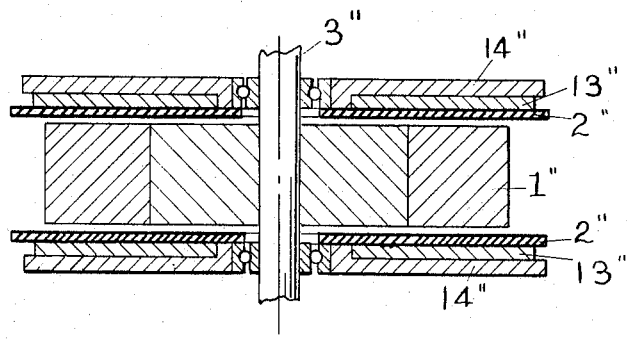
FIG. 5 is a longitudinal sectional view of an axial air gap machine embodiment having an armature on each side of the magnetic element.

In the modification shown in FIG. 5, the annular magnetic element 1" is secured to the spindle 3" between the armature assemblies consisting of armature disks 2", ferromagnetic disks 13" and supporting plates 14", which armature assemblies are rotatably mounted upon spindle 3" by ball bearing means. Flux paths from the magnetic element 1" pass through the armature disks 2" and through portions of the ferromagnetic disks 13".

While the use of flat windings on the armature disks 2 illustrated in the various embodiments is preferable, it is apparent that the principles of the instant invention are also applicable to axial air gap machines having conventional windings—that is, windings imbedded in a ferromagnetic mass or inserted in slots therein.

Although the annular magnetic element 1 has been illustrated as having a rectangular cross-section, it is apparent that the cross-section of the magnetic member may be varied along the periphery thereof to produce the optimum results desired for a given application. Furthermore, the cross-sectional configuration of the poles of the magnetic member may be adapted to the armature winding as desired. The invention is also applicable to the use of a series of coaxially-arranged magnetic circuits with multiple armatures carried by the same spindle, and the invention is equally applicable to alternating-current or direct-current machines.

Figure 6:
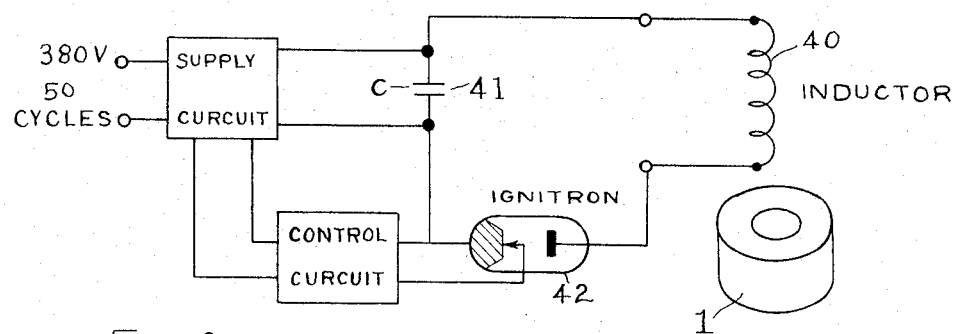
FIG. 6 is a schematic illustration of the apparatus for magnetizing the polar regions in the annular magnet members.

One embodiment of the apparatus for magnetizing the polar regions in the annular magnet members is illustrated in FIG. 6. The annular magnet member 1 is made of a ferromagnetic material having a strong remanence and a high coercivity, such as ceramic ferromagnetic material composed of metal oxides (for example, a barium ferrite) and a ceramic such as "ferroxdurs" manufactured by the firm Societe Philips. The quality of the material is like the iron powder used for agglomerates.

An extremely intense magnetic field—on the order of 14,000 oersteds—is used to achieve the desired magnetization. The magnetic impulses of great amplitude and short duration are achieved by means of the inductor 40 in combination with discharge of condenser 41. The passage of current controls the ignition 42 which suppresses the oscillations of the discharge to cause magnetizaton by inverse current.

The material of the flux return elements (disk 12 of FIG. 3 and disks 13' and 13" of FIGS. 4 and 5) is a ductile material such as an alloy of 50% nickel and 50% iron. One can also utilize a ferrite having a cubical crystalline structure composed of an oxide of iron and an oxide of another metal, for example nickel.

While in accordance with the patent statutes we have illustrated and described the best forms and embodiments of the invention now known to us, it will be apparent to those skilled in the art that other changes may be made in the apparatus described without deviating from the invention set forth in the following claims.

We claim:

A rotary direct current electrical machine of the type having a smooth axially extending air gap between the rotor and stator members thereof, one of said members being constituted by an annular magnetic member formed from a ferromagnetic material such as ferrite having a high remanence and high coercivity and which is magnetized in the axial direction of the machine to establish a plurality of permanently magnetized non-continuous poles which alternate in polarity at each face thereof, and the other of said members being constituted by a pair of thin disks of non-magnetic material, each of said disks being provided with a flat winding on both faces thereof, and said disks being located respectively in parallel spaced and confronting relation to the opposite faces of said annular polarized magnetic member to establish dual, axial air gaps therebetween, the configuration of the faces of the poles of said magnetic member confronting said disks corresponding with the geometrical characteristics of the respective flat windings thereon such that a maximum area of each winding is constantly covered by said pole faces thereby to obtain an optimum inductor effect therebetween.

References Cited by the Examiner

UNITED STATES PATENTS

| | | | |
|---|---|---|---|
| 2,722,617 | 11/1955 | Clewen | 310—154 |
| 2,894,156 | 7/1959 | Kent | 310—154 |
| 2,970,238 | 1/1961 | Swiggett | 310—268 |
| 2,993,135 | 7/1961 | Baudot | 310—268 |

FOREIGN PATENTS 525,895   12/1953   Italy.

OTHER REFERENCES

"Electronics," March 20, 1959, pp. 20–73, D.C. Motor Has Printed Armature.

MILTON O. HIRSHFIELD, *Primary Examiner.*

DAVID X. SLINEY, *Examiner.*

G. P. HAAS, P. L. McBRIDE, *Assistant Examiners.*